US011899733B2

(12) United States Patent
Shalai et al.

(10) Patent No.: US 11,899,733 B2
(45) Date of Patent: Feb. 13, 2024

(54) METHOD AND SYSTEM FOR ACTIVITY PREDICTION, PREFETCHING AND PRELOADING OF COMPUTER ASSETS BY A CLIENT-DEVICE

(71) Applicant: Google LLC, Mountain View, CA (US)

(72) Inventors: Michael Shalai, New York, NY (US); Joseph Catalano, Melville, NY (US); Bo Lin, New York, NY (US); Dustin Zelle, New York, NY (US); Rami Al-Rfou, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/792,965

(22) PCT Filed: Jan. 14, 2020

(86) PCT No.: PCT/US2020/013488
§ 371 (c)(1),
(2) Date: Jul. 14, 2022

(87) PCT Pub. No.: WO2021/145862
PCT Pub. Date: Jul. 22, 2021

(65) Prior Publication Data
US 2023/0050882 A1    Feb. 16, 2023

(51) Int. Cl.
*G06F 7/00* (2006.01)
*G06F 16/957* (2019.01)

(52) U.S. Cl.
CPC .............. *G06F 16/9574* (2019.01)

(58) Field of Classification Search
CPC .. G06F 16/9574; G06F 16/28; G06F 16/9034; G06F 16/9024

(Continued)

(56) References Cited

U.S. PATENT DOCUMENTS

| | | | |
|---|---|---|---|
| 6,182,133 B1* | 1/2001 | Horvitz | G06F 16/9574 |
| | | | 709/203 |
| 8,626,791 B1* | 1/2014 | Lin | G06F 16/9574 |
| | | | 707/777 |

(Continued)

FOREIGN PATENT DOCUMENTS

| | | |
|---|---|---|
| WO | WO 2013/126244 | 8/2013 |
| WO | WO 2015/095065 | 6/2015 |

OTHER PUBLICATIONS

International Preliminary Report on Patentability for Application No. PCT/US2020/013488, dated Jul. 28, 2022, 7 pages.

(Continued)

*Primary Examiner* — Md I Uddin
(74) *Attorney, Agent, or Firm* — Dority & Manning, P.A.

(57) ABSTRACT

A solution arranged to build or train a machine learning model (ML model) that can be uploaded to a server arranged to deploy the ML model to communicating devices. The ML model builder can build the ML model and a ML production pipeline. The ML production pipeline can train the ML model, convert the ML model to a web browser compatible format, and upload the converted ML model to the server. The ML model can receive as input a sequence of prior activities on one communicating device in the communicating devices, analyze the sequence of prior activities on the communicating device, predict a next activity on the communicating device based on the analysis of the sequence of prior activities, preemptively search a computer network based on the predicted next activity to find a computer asset, and preload the found computer asset to a storage in the communicating device.

20 Claims, 6 Drawing Sheets

(58) Field of Classification Search
USPC .......................................... 707/706, 707, 767
See application file for complete search history.

(56) References Cited

U.S. PATENT DOCUMENTS

| | | | |
|---|---|---|---|
| 10,261,938 B1* | 4/2019 | Jenkins | G06F 16/9574 |
| 10,452,978 B2 | 10/2019 | Shazeer et al. | |
| 2009/0018996 A1* | 1/2009 | Hunt | G06F 16/2264 |
| 2019/0303504 A1* | 10/2019 | Pasumarthy | G06F 16/9574 |
| 2020/0110998 A1* | 4/2020 | Nie | G06F 16/9574 |

OTHER PUBLICATIONS

International Search Report and Written Opinion for Application No. PCT/US2020/013488, dated Jul. 21, 2020, 10 pages.

* cited by examiner

METHOD AND SYSTEM FOR ACTIVITY PREDICTION, PREFETCHING AND PRELOADING OF COMPUTER ASSETS BY A CLIENT-DEVICE

PRIORITY CLAIM

This application is based upon and claims the right of priority under 35 U.S.C. § 371 to International Application No. PCT/US2020/013488 filed on Jan. 14, 2020, which is incorporated by reference herein.

FIELD OF THE DISCLOSURE

The present disclosure relates to a computer asset search and delivery solution that includes a method, a system, and a computer program for predicting the next activity based on one or more prior activities on a communicating device, searching a computer network and prefetching or preloading a computer asset to the communicating device based on the predicted activity.

BACKGROUND OF THE DISCLOSURE

In a computer network environment such as the Internet, a communicating device can use web search and retrieval technologies to find webpages on the Internet and download webpages from hosting websites to the communicating device. The webpages can then be rendered on a display device, such as a display device included in the communicating device.

All too frequently, the web search and retrieval technologies can experience substantially latency and take a long time to find or load a webpage to the communicating device. This can happen, for example, when the communicating device is operating in a low-signal strength area, where the communication link to an Internet Service Provider (ISP) or website is saturated or overburdened, where bandwidth restrictions significantly limit or restrict the amount or rate of data that can be transmitted through the communication link, where the source website or ISP server is experiencing unusually heavy data traffic volume, or when the content includes large amounts of data. There exists an urgent and unfulfilled need for a computer asset search and delivery solution that can address such drawbacks.

SUMMARY OF THE DISCLOSURE

The instant disclosure provides a computer asset search and delivery solution that meets the unfulfilled need and addresses the above noted drawbacks. The computer asset search and delivery solution can predict the next activity on a communicating device and search and prefetch or preload one or more computer assets to the communicating device based on the prediction. The solution can provide a smart, behavior-based prefetching approach that can avoid overfetching and, thereby, save user-bandwidth that can be precious on communicating devices such as, for example, mobile devices.

A nonlimiting embodiment of the computer asset search and delivery solution includes a non-transitory computer-readable storage medium containing computer executable instructions that, when executed by a computing device, cause the computing device to perform a method to build or train a machine learning model and to cause the machine learning model to be deployed to a plurality of communicating devices. The method comprises building, by the computing device, the machine learning model, training, by the computing device, the machine learning model, converting, by the computing device, the machine learning model into a web browser compatible format, and uploading, by the computing device, the machine learning model to a server that is arranged to deploy the machine learning model to the plurality of communicating devices. In the method, the machine learning model can be arranged to receive as input a sequence of one or more prior activities on one communicating device in the plurality of communicating devices, analyze the sequence of one or more prior activities on said one communicating device, predict a next activity on said one communicating device based on the analysis of the sequence of one or more prior activities, preemptively search a computer network based on the predicted next activity to find a computer asset, and preload the found computer asset to a storage in said one communicating device.

The machine learning model can be arranged to render the found computer asset as a webpage on said one communicating device, or integrate with front-end code of a web browser on said one communicating device, or invoke JavaScript in a web browser on said one communicating device, or render the computer asset as the webpage in response to a further activity on the communicating device. The further activity can match the predicted next activity. The machine learning model can comprise a Transformer model, or a feed-forward deep neural network model, or an attention mechanism. The attention mechanism can comprise a padding attention mask or a look-ahead attention mask.

The predicted next activity can comprise an input on a user interface that includes one or more natural language terms or a search query input to a web browser on said one communicating device.

Another nonlimiting embodiment of the computer asset search and delivery solution includes a system arranged to build or train a machine learning model and to upload the machine learning model to a server arranged to deploy the machine learning model to a plurality of communicating devices. The system comprises a machine learning model builder arranged to build the machine learning model and a machine learning production pipeline. The machine learning production pipeline can be arranged to train the machine learning model, convert the machine learning model to a web browser compatible format, and upload the converted machine learning model to the server. The machine learning model can be arranged to receive as input a sequence of one or more prior activities on one communicating device in the plurality of communicating devices, analyze the sequence of one or more prior activities on said one communicating device, predict a next activity on said one communicating device based on the analysis of the sequence of one or more prior activities, preemptively search a computer network based on the predicted next activity to find a computer asset, and preload the found computer asset to a storage device in said one communicating device.

In the system, the machine learning model can be arranged to render the found computer asset as a webpage on said one communicating device, or integrate with front-end code of a web browser on said one communicating device, or invoke JavaScript in a web browser on said one communicating device, or render the computer asset as the webpage in response to a further activity on the communicating device.

In the system, the further activity can match the predicted next activity.

In the system, the machine learning model can comprise a Transformer model, or a feed-forward deep neural network model, or an attention mechanism. The attention mechanism can comprise a padding attention mask or a look-ahead attention mask.

In the system, the predicted next activity can comprise an input on a user interface that includes one or more natural language terms or a search query input to a web browser on said one communicating device.

Another nonlimiting embodiment of the computer asset search and delivery solution includes a computer implemented method for activity prediction. The method comprises receiving, at a machine learning model, as input a sequence of one or more prior activities on one communicating device of a plurality of communicating devices, analyzing, by the machine learning model, the sequence of one or more prior activities on said one communicating device, predicting, by the machine learning model, a next activity on said one communicating device based on the analysis of the sequence of one or more prior activities, preemptively searching a computer network based on the predicted next activity to find a computer asset, and preloading the found computer asset to a storage in said one communicating device. The method can comprise rendering the found computer asset as a webpage on said one communicating device.

In the computer implemented method, the machine learning model can be integrated with front-end code of a web browser on said one communicating device.

In the computer implemented method the machine learning model can be arranged to invoke JavaScript in a web browser on said one communicating device.

In the computer implemented method, rendering the computer asset as the webpage can occur in response to a further activity on the communicating device.

In the computer implemented method, the further activity can match the predicted next activity.

In the computer implemented method, the machine learning model can comprise a Transformer model, or a feed-forward deep neural network model, or an attention mechanism. The attention mechanism can comprise a padding attention mask or a look-ahead attention mask.

In the computer implemented method, the predicted next activity can comprise an input on a user interface that includes one or more natural language terms or a search query input to a web browser on said one communicating device.

The computer implemented method can comprise, prior to receiving the input, building the machine learning model, training the machine learning model, converting the machine learning model into a web browser compatible format, and uploading the machine learning model to a server that is arranged to deploy the machine learning model to the plurality of communicating devices.

Another nonlimiting embodiment of the computer asset search and delivery solution includes a system that comprises a processor adapted to perform the computer implemented method.

Another nonlimiting embodiment of the computer asset search and delivery solution includes a computer program product that comprises instructions which, when the program is executed by a computer, cause the computer to carry out the computer implemented method.

Additional features, advantages, and embodiments of the disclosure may be set forth or apparent from consideration of the specification, including the detailed description, claims and drawings. The summary of the disclosure and the following detailed description and drawings may provide examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain principles of the disclosure. No attempt is made to show structural details of the disclosure in more detail than may be necessary for a fundamental understanding of the disclosure and the various ways in which it can be practiced.

Figure 1:
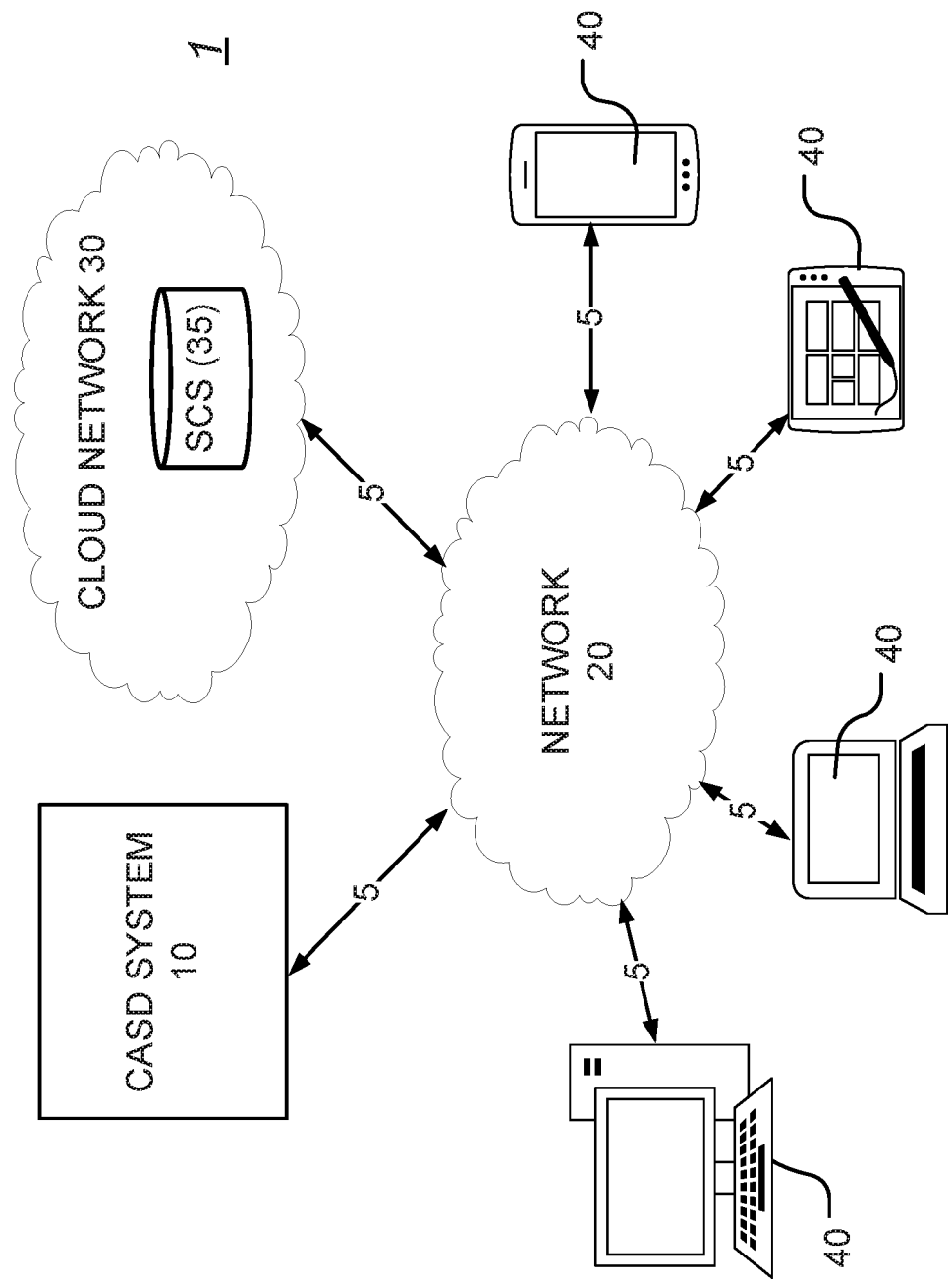
FIG. 1 depicts an example of a computer network environment that includes a computer asset search and delivery (CASD) system that is constructed according to the principles of the disclosure.

The present disclosure is further described in the detailed description that follows.

DETAILED DESCRIPTION OF THE DISCLOSURE

The disclosure and the various features and advantageous details are explained more fully with reference to the nonlimiting embodiments and examples that are described or illustrated in the accompanying drawings and detailed in the following description. It should be noted that the features illustrated in the drawings are not necessarily drawn to scale, and features of one embodiment can be employed with other embodiments, even if not explicitly stated. Descriptions of well-known components and processing techniques may be omitted so as to not unnecessarily obscure the embodiments of the disclosure. The examples are intended merely to facilitate an understanding of ways in which the disclosure can be practiced and to further enable those of skill in the art to practice the embodiments of the disclosure. Accordingly, the examples and embodiments should not be construed as limiting the scope of the disclosure. Moreover, it is noted that like reference numerals represent similar parts throughout the several views of the drawings.

The Internet is a network of networks that carries a vast range of computer assets and services over a global system of interconnected computer networks that use the Internet protocol suite (TCP/IP) to link communicating devices worldwide. The computer assets can include, for example, inter-linked hypertext documents and applications of the World Wide Web (WWW), electronic mail, telephony and file sharing. Hypertext is one of the underlying concepts of the WWW, where a computer asset such as web content or a webpage can be written in Hypertext Markup Language (HTML). Hypertext computer assets can either be static or dynamic. Static computer assets can be prepared and stored in advance. Dynamic computer assets can change continually, such as in response to an input or activity on a communicating device.

Client-side communicating devices such as the communicating devices 40 (shown in FIG. 1 and discussed below) can access computer assets on the Internet using web browsers that include one or more web application programming interfaces (Web APIs). An application programming interface (API) can include a set of subroutine definitions, protocols and tools for building software and applications; and, a Web API is an API that can be accessed and interacted with using Hypertext Transfer Protocol (HTTP) commands. The HTTP protocol defines what actions client-side web browsers should take on the communicating devices in response to various commands.

When a communicating device 40 (shown in FIG. 1) visits a website or otherwise accesses a computer asset on a computer network 20 (shown in FIG. 1), the device's web browser can retrieve the computer asset from a web server (not shown) that hosts the website or computer asset. In order to graphically display web content or a webpage included in the computer asset, the web browser may need to access multiple web resource elements, such as style sheets, scripts, and images, while presenting the computer asset as, for example, a webpage. Latency can be a serious problem when the communicating device 40 (shown in FIG. 1) is operating in a low-signal strength area, where the communication link to an ISP or website hosting server is saturated or overburdened, where available bandwidth is significantly limited or restricted, where the website host or ISP server (not shown) is experiencing unusually heavy traffic volume, or where the content includes large amounts of data.

The disclosure may provide a computer asset search and delivery (CASD) solution that can significantly reduce or eliminate latency in finding, delivering or rendering computer assets, such as, for example, web content or webpages, on the communicating device 40 (shown in FIG. 1). The solution provides a system, method and computer program for predicting the next activity on the communicating device 40 and preemptively searching and prefetching or preloading one or more computer assets to the communicating device 40 based on the predicted activity, such that the computer asset can be rendered on the device nearly instantaneously when the operator or communicating device performs an activity that substantially matches the predicted activity. Accordingly, the disclosed technique can reduce latency in response to further activities. Further, since preloading and/or prefetching can be targeted, the approach can avoid unnecessary utilization of network and computer resources.

The solution can include a client-side web browser that can find, access, prefetch, preload, or process computer assets, and, subsequently, render the assets on the communicating device 40, such as, for example, one or more webpages displayed by the communicating device 40. The solution can include a machine learning (ML) model that, based on an input sequence of one or more activities, can predict the next activity on the communicating device 40. The ML model can be loaded to and included in the communicating device 40. The ML model can include a Transformer model, as discussed below. The ML model can be loaded by a computer asset search and delivery (CASD) system 10 to the communicating device 40, either directly or through a content service provider, such as, for example, a computer cloud network 30 (shown in FIG. 1), which can be operated or managed by a cloud service provider.

The solution can include an attention mechanism. The attention mechanism can include at least one of a padding attention mask and a look-ahead attention mask. The attention mechanism can include multi-head attention with both a padding attention mask and a look-ahead attention mask. The attention mechanism can include self-attention. The attention mechanism can include scaled dot-product attention. When an incomplete sequence of activities is performed on or by the communicating device 40, such as, for example, page transitions, button clicks, or remote procedure calls (RPCs), the computer asset search and delivery solution can predict the next one or more subsequent activities on the communicating device 40 and, based on the predicted activity(ies), search or cause the client-side web browser on the communicating device 40 to search the computer network 20 (shown in FIG. 1) for computer assets that are likely to be the best match results based on the predicted activity, and prefetch or preload the computer assets, or cause the client-side web browser on the communicating device 40 to prefetch or preload the computer assets to the communicating device 40. The preloaded computer assets can be rendered as, for example, one or more webpages on the display of the communicating device 40 before the next activity is executed on the communicating device 40, or after an activity that matches the predicted next activity is executed on the communicating device 40.

In a nonlimiting implementation, the computer asset search and delivery solution can predict the next entry or multiple entries on the communicating device 40 by an end-user operator and proactively prefetch or preload webpage results based on the prediction. The preloaded webpage results can be stored in a local random-access memory (RAM) or storage area in the communicating device 40 and made available for near-instantaneous rendering on the display of the communicating device 40. The stored webpage results can be rendered on the display when the operator or the communicating device 40 performs an activity that substantially matches the predicted activity. Alternatively, the webpage result can be rendered before the activity is provided on or to the communicating device 40.

FIG. 1 depicts a block diagram of a nonlimiting example of a computer network environment 1 that includes the computer asset search and delivery (CASD) system 10, constructed according to the principles of the disclosure. The computer network environment 1 can include the network 20 and a plurality of communicating devices 40. The computer network environment 1 can include the computer cloud network 30. The components in the computer network environment 1 can each transmit or receive data traffic through a communication link 5.

The CASD system 10 can be arranged to build or train one or more machine learning (ML) models for deployment to the communicating devices 40. The CASD system 10 can be arranged to download an ML model to each of the communicating devices 40, which can then predict the next activity on the communicating device 40 using the loaded ML model. The ML model can be loaded directly from the CASD system 10. The ML model can be uploaded by the CASD system 10 to a content service provider, such as, for example, a static content service (SCS) in the computer cloud network 30. The computer cloud network 30 can be operated or maintained by a cloud service provider. The cloud network 30 can include a static content service (SCS) database 35, which can be arranged to receive and store the ML model uploaded from the CAST system 10. The content service provider can load the ML model directly to the communicating devices 40.

With the ML model installed, the communicating device 40 can preemptively search the computer network 20 for computer assets based on a predicted activity, and prefetch or preload those assets identified in the preemptive search. The assets can be stored locally in the communicating device 40 and made readily available for display on its display device when the operator interacts (for example, via user interface such as keyboard, keypad, or touch-screen display) with the communicating device 40 and provides an activity that substantially matches the predicted activity. The computer asset can include a computer application, or web content or a webpage that has static or moving multimedia content, including, for example, textual content, sound content, video content, or any other type of data that can be rendered by the communicating device 40. For example, the computer asset can include an HTML document that is assisted by technologies such as Cascading Style Sheets (CSS) and scripting languages such as JavaScript. The computer asset can include image rendering commands such as, for example, JavaScript commands, which can be embedded in the HTML document to affect the behavior and content of the web content when it is rendered on the communicating device 40.

The CASD system 10 can include a computing device, such as, for example, a server or an array of servers. The CASD system 10 can be operated or maintained by, for example, an ISP or a search engine operator that operates a search engine web site or server. The CASD system 10 can include a computing device of an Internet Service Provider (ISP). The CASD system 10 can build an ML model, train the model and store the model in a web-compatible format. The model can be downloaded from the cloud network 30 (or the CASD system 10) to one or more communicating devices 40. The same ML model can be downloaded to each of the communicating devices 40. Additional ML models can be downloaded to each of the communicating devices 40, depending on the client applications that are installed or operating on the devices.

Once loaded and installed on the communicating device 40, the ML model can be executed by the device to predict the next activity on the communicating device 40 when a sequence of one or more prior activities are performed during a session. The prediction can be based on the activities performed by the communicating device 40 in response to operator interactions, or the activities performed by the operator on the communicating device 40. The prediction results can be used by the communicating device 40 to search and prefetch or preload computer assets to the device. The computer assets can be prefetched or preloaded asynchronously from a server, for example, using JavaScript in a background thread, allowing the communicating device 40 to interact with the operator via a user interface device, such as, for example, a graphic user interface (GUI).

The communicating device 40 can include a display device. The communicating device 40 can be arranged to communicate via the network 20 and, by executing image rendering commands, for example, in a web browser in the device, render computer assets on the display device, for example, as one or more webpages. The communicating device 40 can interface with the operator and receive a request for a computer asset. The request can include a request to a search engine, including a search query. The request can include a request to access or retrieve a computer asset such as a webpage or website. The communicating device 40 can render and display the computer asset received from or over the network 20. The communicating device 40 can display the computer asset on a display screen of the display device. The computer asset can be received and processed locally at the communicating device 40 by a client application, such as, for example, a web browser. The computer asset can include data or instructions, such as, for example, JavaScript, to generate/render webpages on the communicating device 40.

The computer asset can include image rendering commands such as, for example, markup language annotations for identifying content and creating or modifying images, links, sounds, or other objects in the computer asset. The markup language annotations can include a plurality of tags for displaying static or moving content on the communicating device 40. The markup language can include, for example, one or more of: Standard Generalized Markup Language (SGML), Scalable Vector Graphics (SVG), Hypertext Markup Language (HTML), Extensible Markup Language (XHTML or XML), XML User Interface Language (XUL), LaTeX, or any other markup language that can be used by a client application such as, for example, a web browser on the communicating device 40 for rendering the computer asset on the display of the communicating device 40. The markup language annotations can be executed by, for example, the web browser running on the communicating device 40 to render computer assets with animated or still web content on its display device.

The rendering commands can include style sheet language annotations for providing rules for stylistics and for describing the presentation of the computer asset with the markup language annotations. The style sheet language annotations can include, for example, colors, fonts, layouts, or other stylistic properties. The style sheet language can include, for example, one or more of: Cascading Style Sheet (CSS), Document Style Semantics and Specification Language (DSSSL), or Extensible Stylesheet Language (XSL). The style sheet language annotations can be provided as a style sheet language file. Alternatively, the style sheet language annotations can be incorporated into a file containing the markup language annotations.

The rendering commands can include scripting language instructions to create interactive effects related to the markup language annotations or style sheet language annotations. The scripting language can include, for example, Bash (e.g., for Unix operating systems), ECMAScript (or JavaScript) (e.g., for web browsers), Visual Basic (e.g., for Microsoft applications), Lua, or Python. The scripting language instructions can include instructions that, when executed by client application such as, for example, the web browser on the communicating device 40, effectuate rendering of the computer asset as one or more webpages on the display device of the communicating device 40.

The scripting language instructions can rely on a run-time environment such as a client application on the communicating device 40 (such as, for example, the web browser) to provide objects and methods by which scripts can interact with the environment, such as, for example, a webpage document object model (DOM) that can work with an XML or HTML document. The scripting language instructions can rely on the run-time environment to provide the ability to include or import scripts, such as for example, HTML <script> elements. The scripting language instructions can include, for example, JavaScript instructions that can effectuate processing of the computer asset by a JavaScript engine from a queue one at a time. For instance, JavaScript can call a function associated with the computer asset and create a call stack frame with the function's arguments and local variables. The call stack can shrink and grow based on the function's needs. When the call stack is empty upon function completion, JavaScript can proceed to the next computer asset in the queue.

The scripting language instructions can be used by the client-side web browser on the communicating device 40 to process the computer asset into a plurality of rows or columns of pixel data and display the computer asset as one or more webpages. The image rendering commands can include a document object model (DOM) such as for HTML or XML (e.g., DOM5 HTML) that can create object-oriented representations of a webpage that can be modified with the scripting language instructions. A DOM can include a cross-platform or language-independent convention for representing and interacting with objects in HTML, XHTML/XML, SGML, SVG, or XUL.

The communicating device 40 can include one or more user interface devices. In general, a user interface device can be any electronic device that conveys data to an operator by generating sensory information (for example, a visualization on a display, one or more sounds, a haptic production (for example, Braille produced on a haptic display, or a vibration), or converting received sensory information from the operator into electronic signals (for example, a keyboard, a mouse, a pointing device, a touch screen display, or a microphone)). The one or more user interface devices can be internal to a housing of the communicating device 40 (for example, a built-in display, keyboard, microphone, or touchpad) or external to the housing (for example, a display device, camera, speaker or microphone connected to the communicating device 40).

The communicating device 40 can include an electronic display device that visually displays computer assets using data and instructions received from one or more sources of computer assets in the network 20.

Figure 2:
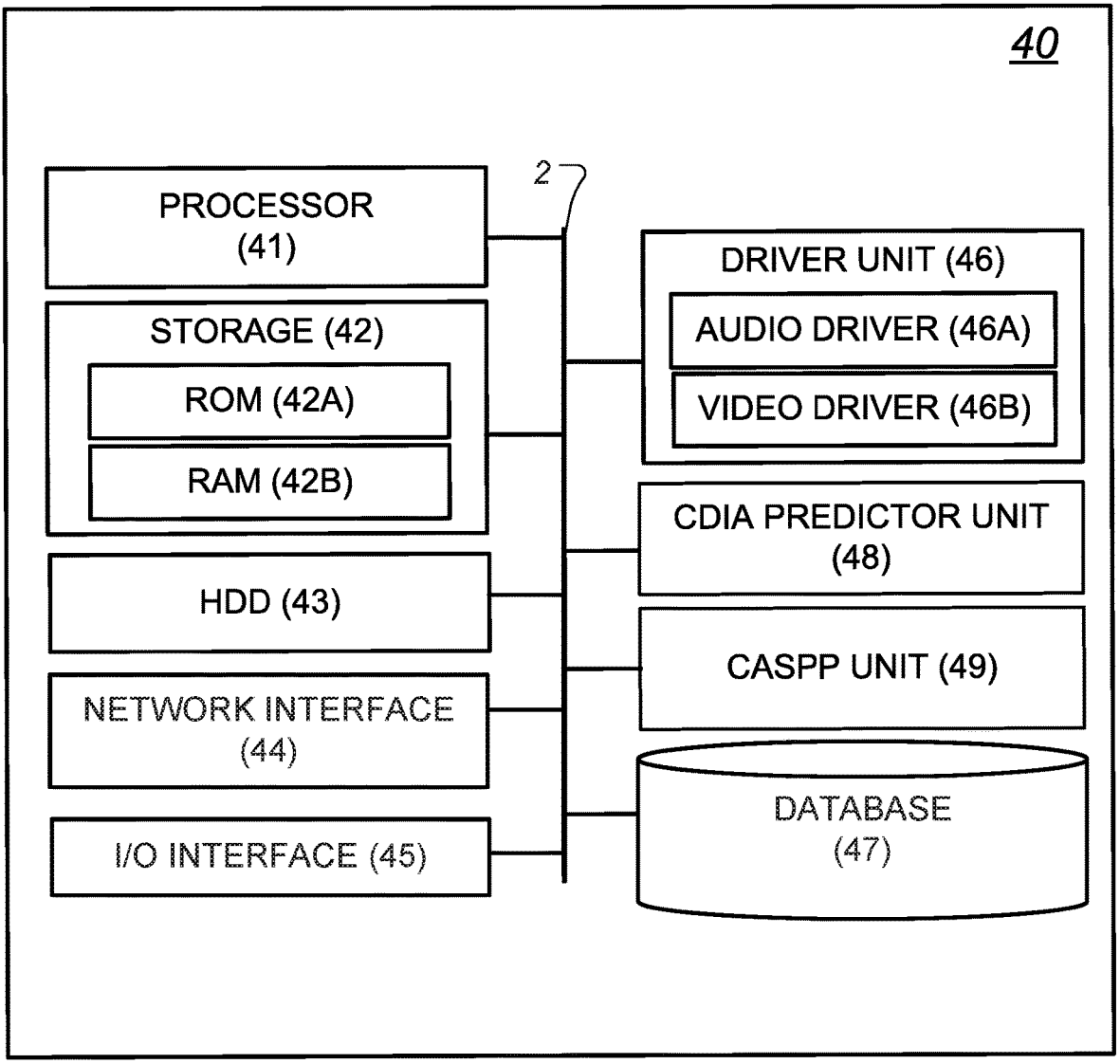
FIG. 2 depicts a nonlimiting embodiment of a communicating device that can be included in the computer network environment in FIG. 1.

FIG. 2 is a block diagram depicting a nonlimiting embodiment of the client-side communicating device 40. The communicating device 40 can include, among other things, one or more components 41 to 49, each of which can be connectable to a communication link. The communicating device 40 can include a bus 2, which can be connectable to each of the components 41 to 49 by a unique or common communication link. The components 41 to 49 can be arranged as a plurality of computing devices, or as a plurality of modules in one or more computing devices.

The components 41 to 49 can include a processor 41, a storage 42, a hard disk drive (HDD) 43, a network interface 44, an input/output (I/O) interface 45, a driver unit 46, a database 47, a communicating device input or activity (CDIA) predictor unit 48, and a computer asset search and prefetch or preload (CASPP) unit 49. Any one or more of the components 42 to 49 can include a computing device or a module that is separate from the processor 41 (e.g., as seen in FIG. 2) or the component(s) can be integrated or integratable in a computing device such as the processor 41. The communicating device 40 can include a sound generation device (not shown), such as, for example, a speaker, and an image rendering device such as the display device.

The processor 41 can include a computing device such as, for example, a central processing unit (CPU), a graphic processing unit (GPU), a general-purpose GPU (GPGPU), a field programmable gate array (FGPA), an application-specific integrated circuit (ASIC), or a manycore processor.

The processor 41 can process instructions for execution within the communicating device 40, including instructions stored in the storage 42. The processor 41 can process instructions to display graphical information for a GUI on an external input/output device, such as the display device, which can be connected to, for example, the I/O interface 45.

The communicating device 40 can include a computer-readable medium that can hold executable or interpretable computer code (or instructions) that, when executed by the processor 41, or one of the other device components, causes the steps, processes and methods in the communicating device 40 to be carried out. The computer-readable medium can be provided in the storage 42 or HDD 43. The computer readable medium can include sections of computer program code or instructions that, when executed by the processor 41 and/or one of the other device components, cause the communicating device 40 to carry out, for example, the Steps 340 or 350 (shown in FIG. 5), as well as all other processes, methods or steps contemplated in this disclosure to be carried out by the communicating device 40.

The storage 42 can include a read only memory (ROM) 42A and a random-access memory (RAM) 42B. A basic input/output system (BIOS) can be stored in the non-volatile memory 42A, which can include, for example, a ROM, an EPROM, or an EEPROM. The BIOS can contain the basic routines that help to transfer information between device components in the communicating device 40, such as during start-up. The RAM 42B can include a high-speed RAM such as static RAM for caching data. The HDD 43 can include a hard disk drive.

The storage 42 or HDD 43 can include a computer-readable media that can provide nonvolatile storage of data, data structures, and computer-executable code or instructions. The storage 42 or HDD 43 can accommodate the storage of any data in a suitable digital format. The storage 42 or HDD 43 can include one or more computer applications that can be used to execute aspects of the architecture described herein. The storage 42 or HDD 43 can include, for example, flash memory or NVRAM memory.

One or more computer program modules can be stored in the storage 42 or HDD 43, including an operating system, a client application, an API, and program data. The API can include, for example, a Web API, a simple object access protocol (SOAP) API, a remote procedure call (RPC) API, a representation state transfer (REST) API, or other utility or services API. Any (or all) of the computer program modules can be cached in the RAM 42B as executable sections of computer program code.

The network interface 44 can be connectable to a network such as the network 20 or cloud network 30 (shown in FIG. 1). The network interface 44 can be connectable to the network 20 or cloud network 30 via one or more communication links 5 (shown in FIG. 1). The network interface 44 can include a wired or a wireless communication network interface (not shown) or a modem (not shown). When used in a local area network (LAN), the communicating device 40 can be connected to the LAN network through the wired or wireless communication network interface; and, when used in a wide area network (WAN), the communicating device 40 can be connected to the WAN network through the modem. The network 20 or cloud network 30 (shown in FIG. 1) can include a LAN, a WAN, the Internet, or any other network of computing devices or communicating devices. The modem (not shown) can be internal or external and wired or wireless. The modem (not shown) can be connected to the bus 2.

The (I/O) interface 45 can receive commands and data from an operator. The I/O interface 45 can be arranged to connect to one or more input/output devices (not shown), including, for example, a keyboard (not shown), a mouse (not shown), a pointer (not shown), a microphone (not shown), a speaker (not shown), or a display (not shown). The received commands and data can be forwarded from the I/O interface 45 as instruction and data signals via the bus 2 to any component in the communicating device 40.

The driver unit 46 can include an audio driver 46A and a video driver 46B. The audio driver 46A can include a sound card, a sound driver (not shown), an interactive voice response (IVR) unit, or any other device or module necessary to render a sound signal on a sound production device (not shown), such as for example, a speaker (not shown). The video driver 46B can include a video card (not shown), a graphics driver (not shown), a video adaptor (not shown), or any other device or module necessary to render an image or video signal on a display device.

The CDIA predictor unit 48 can include a computing device or module, or it can be included in a computing device or module. The CDIA predictor unit 48 can be included or integrated in the processor 41. The CDIA predictor unit 48 can include a machine learning (ML) platform. The ML platform can comprise one or more ML models. The model can be downloaded to the communicating device 40 from the SCS 35 (shown in FIG. 1) or from the CASD system 10 (shown in FIG. 1). The ML platform can include supervised machine learning, unsupervised machine learning or both supervised and unsupervised machine learning. The ML platform can include, for example, an artificial neural network (ANN), a convolutional neural network (CNN), a deep CNN (DCNN), an RCNN, a Mask-RCNN, a deep convolutional encoder-decoder (DCED), a recurrent neural network (RNN), a neural Turing machine (NTM), a differential neural computer (DNC), a support vector machine (SVM), a deep learning neural network (DLNN), Naive Bayes, decision trees, linear regression, Q-learning, temporal difference (TD), deep adversarial networks, fuzzy logic, or any other machine intelligence platform capable of supervised or unsupervised machine learning. The CDIA predictor unit 48 can include one or more platform-neutral or platform-agnostic APIs.

The CDIA predictor unit 48 can be arranged to listen for or monitor activities on the communicating device 40, including one or more activities during a single session of operation of a client application, such as, for example, a web browser on the device. The CDIA predictor unit 48 can be arranged to monitor and learn operator behavior, including patterns of behavior when operating client applications on the communicating device 40, and log and record the related activities in the storage 42 or database 47. The CDIA predictor unit 48 can be arranged to send the activity log data to the CASD system 10 (shown in FIG. 1), so that it can be used as training data to fine-tune or update ML models built by the CASD system 10.

The CDIA predictor 48 can receive an input or listen for and monitor one or more activities, which can include a sequence of one or more activities that are performed on or by a client-side client application during a session. The CDIA predictor 48 can be arranged to analyze the sequence of one or more activities and predict a next activity that is likely to be performed by the operator on the client application or communicating device 40. For instance, during a user login session, the CDIA predictor 48 can analyze a sequence of activities by the operator that have already occurred or as they occur during the session and, then, predict the next activity that is likely to occur during that session, which can include, for example, an RPC, an App, or just "doing nothing."

The CDIA predictor 48 can include the front-end computer program code of client application (such as, for example, a client-side web browser) integrated or incorporated with the ML model, so that it can be executed on the client application. Since both the input to the ML model and the output from the ML model can be kept simple, the CDIA predictor 48 can make a prediction nearly instantaneously, such as, for example, on the order of a few microseconds ($\mu s$) to a few hundred microseconds or milliseconds, or longer. The CDIA predictor 48 can operate in the background on the communicating device 40, thereby allowing the operator to interact with one or more other client applications on the communicating device 40 to perform other, unrelated activities.

In a nonlimiting embodiment, the CDIA predictor unit 48 includes a feed-forward deep neural network (DNN) and a Transformer (or sequence transduction) ML model, which can be arranged to connect an encoder and a decoder through an attention mechanism. The Transformer model can include a model architecture, including an encoder-decoder structure, such as, for example, described in the article titled "*Attention Is All You Need*," by Ashish Vaswani, et al., published by the 31$^{st}$ Conference on Neural Information Processing Systems (NIPS 2017), Long Beach, CA, USA. The description of the Transformer model provided in the article is hereby incorporated herein by reference, including the Transformer model architecture depicted in FIG. 1 in the article. The Transformer model can predict activities such as operation actions based on a natural language approach. The Transformer model can be trained based on an operator journey, such as, for example, a history of activities (for example, operator actions) on a client application (app) on the communicating device 40 using a natural language approach. The Transformer model can be stored in the communicating device 40 in a web-compatible format. The Transformer model can predict the next activity that is likely to occur on a client app or on the communicating device 40 based on earlier activities in the operator journey. The predicted result can be used to preemptively search and prefetch or preload a computer asset to the communicating device 40.

A client application can include, but is not limited to, for example, a web browser application, a merchant or vendor application, a shopping application, a user application, a an email application, a government entity application, a machine translation application, a language translation application, a web compatible application, a social network application, or any other client-side computer application that can be loaded or installed on the communicating device 40.

The CDIA predictor 48 can include an attention mechanism. The attention mechanism can include an attention function, as described, for example, in the above-mentioned article, titled "*Attention Is All You Need*," by Ashish Vaswani, et al., Section 3 ("Model Architecture") of which is herein incorporated in its entirety by reference, or in U.S. Pat. No. 10,452,978, titled "Attention-Based Sequence Transduction Neural Networks," issued Oct. 22, 2019 to Noam M. Shazeer, et al., the entirety of which is incorporated herein by reference. The attention mechanism can be arranged to map a query and a set of key-value pairs to an output, where the query, keys, values, and output are all vectors. The output can be computed as a weighted sum of the values, where the weight assigned to each value can be computed by a compatibility function of the query with the corresponding key. The attention mechanism can be used by the transformer model to calculate attention weights.

The attention mechanism can have a padding attention mask and a look-ahead attention mask. The attention mechanism can include self-attention or multi-head attention. Self-attention (also known as intra-attention) can be arranged to attend to different positions of a single input sequence to compute a representation of that sequence. The multi-head attention can be arranged to linearly project queries, keys and values multiple times with different, learned linear projections to a plurality of respective dimensions. On each of the projected versions of queries, keys and values, the transformer model can perform the attention function in parallel, yielding multi-dimensional output values that can be concatenated and again projected, resulting in final values that can be used by the transformer model.

The padding attention mask can be arranged to mask all pad tokens in a sequence and ensure that the model does not treat padding as an input. The padding attention mask can indicate where pad values are present and output a value (for example, "1") at those locations, and output another value (for example, "0") at the remaining locations.

The look-ahead mask can be arranged to mask future tokens in a sequence. For instance, the look-ahead mask can be arranged to indicate which entries in a sequence should not be used.

The CASPP unit 49 can include a computing device or module, or it can be included in a computing device or module. The CASPP unit 49 can be included or integrated in the processor 41. The CASPP unit 49 can be combined with the CDIA predictor unit 48 in a single computing device or module. The CASPP unit 49 can include an ML platform. The ML platform can include an ML model. The ML model can be downloaded to the communicating device 40 from the SCS 35 (shown in FIG. 1). In the nonlimiting embodiment where the CDIA predictor unit 48 and CASPP unit 49 are combined in a single computing device or module, the embodiment can include a single ML model that performs the processes or operations of both the CDIA predictor unit 48 and CASP unit 49.

The CASPP unit 49 can be arranged to receive prediction data from the CDIA unit 48 and, based on the prediction data, preemptively search or cause a web browser in the communicating device 40 to preemptively search the network 20 for computer assets that might be related to the prediction data, or the computer asset(s) that the operator might expect to receive and view when the predicted activity is performed on the communicating device 40. The CASPP unit 49 can analyze the preemptive search results and, based on the prediction data, prefetch and preload the computer asset that is a best matching result. The best matching result can be determined by, for example, a DNN in the CASPP unit 49, which can apply the ML model to analyze all (or a portion of all) search results, calculating relevance weights for the results and identifying the result having the greatest relevance to the prediction data. In an embodiment, the CASPP unit 49 can interact with, for example, the web browser in the communicating device to preemptively search, prefetch and preload the computer asset having the greatest relevance value.

The database 47 can be arranged as a separate computing device or module (as shown in FIG. 2), or it can be included or integrated in HDD 43. The database 47 can store computer assets that are prefetched or preloaded to the communicating device 40. The database 47 can store historical activity data for each client application on the communicating device 40. The database 47 can store historical activity data for each session carried out on each client application. The database 47 can store the activity data as files or records.

The files or records can be linked to each unique client application on, or each operator that has used the communicating device 40. Stored activity data can be accessed, searched, or retrieved from the database 47 and sent to one or more of the components (for example, processor 41, CDIA predictor unit 48, or CASPP unit 49) in the communicating device 40. The activity data can be retrieved and sent to the CASD system 10, either directly or via the cloud network 30 (shown in FIG. 1).

Figure 3:
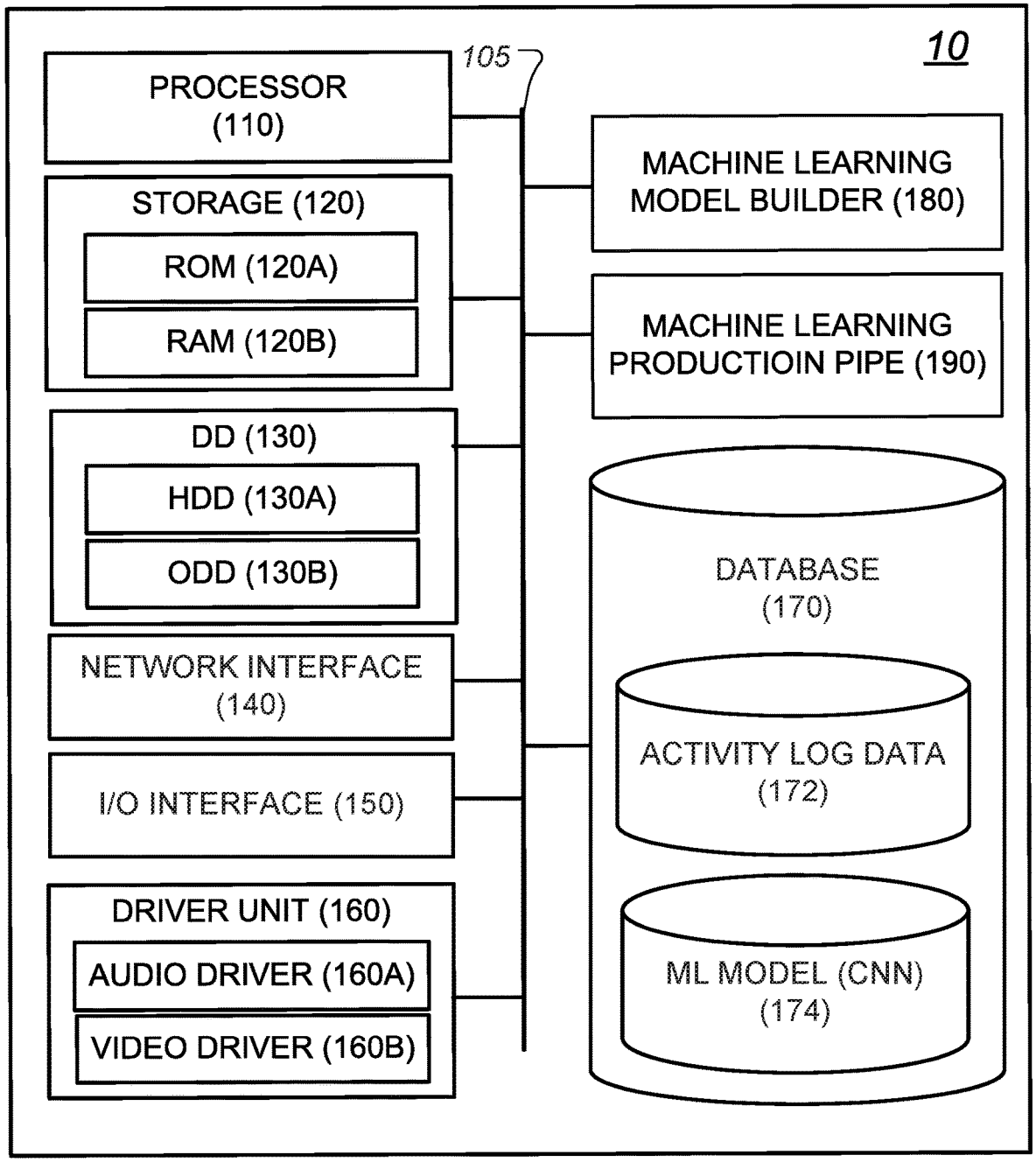
FIG. 3 depicts a non-limiting embodiment of the CASD system, constructed according to the principles of the disclosure.

FIG. 3 is a block diagram depicting a nonlimiting embodiment of the CASD system 10, constructed according to the principles of the disclosure. The CASD system 10 can be arranged as one or more computing devices. The CASD system 10 can include a processor 110, a storage 120, a disk drive (DD) 130, a network interface 140, an input/output (I/O) interface 150, a driver unit 160, and a database 170. The CASD system 10 can include a machine learning model (MLM) builder 180. The CASD system can include a machine learning production (MLP) pipeline 190. The CASD system 10 can include a bus 105, which can connect to each of the components 110 to 190. The bus 105 can be connectable by a communication link to each of the components 110 to 190.

The CASD system 10 can include a sound generation device (not shown), such as, for example, a speaker, or video generation device such as a display device (not shown).

The CASD system 10 can include one or more high-speed interfaces (not shown), high-speed expansion ports (not shown), low speed interfaces (not shown) or mass storage devices (not shown), which can be interconnected using various busses, and can be mounted on a common motherboard or in other manners as appropriate.

The processor 110 can include a computing device, such as, for example, any of various commercially available graphic processing unit devices. Dual microprocessors and other multi-processor architectures can be included in the processor 110. The processor 110 can include a central processing unit (CPU), a graphic processing unit (GPU), a general-purpose GPU (GPGPU), a field programmable gate array (FGPA), an application-specific integrated circuit (ASIC), or a manycore processor. The processor 110 includes a computing device. The processor 110 can include a computing device in the communicating device 40 (shown in FIG. 1).

The processor 110 can process instructions for execution within the CASD system 10, including instructions stored in the storage 120. The processor 110 can process instructions to display graphical information for a GUI on an external input/output device, such as a display device coupled to the I/O interface 150 or the high-speed interface (not shown). In other implementations, multiple processors and/or multiple buses may be used, as appropriate, along with multiple memories and types of memory.

Figure 5:
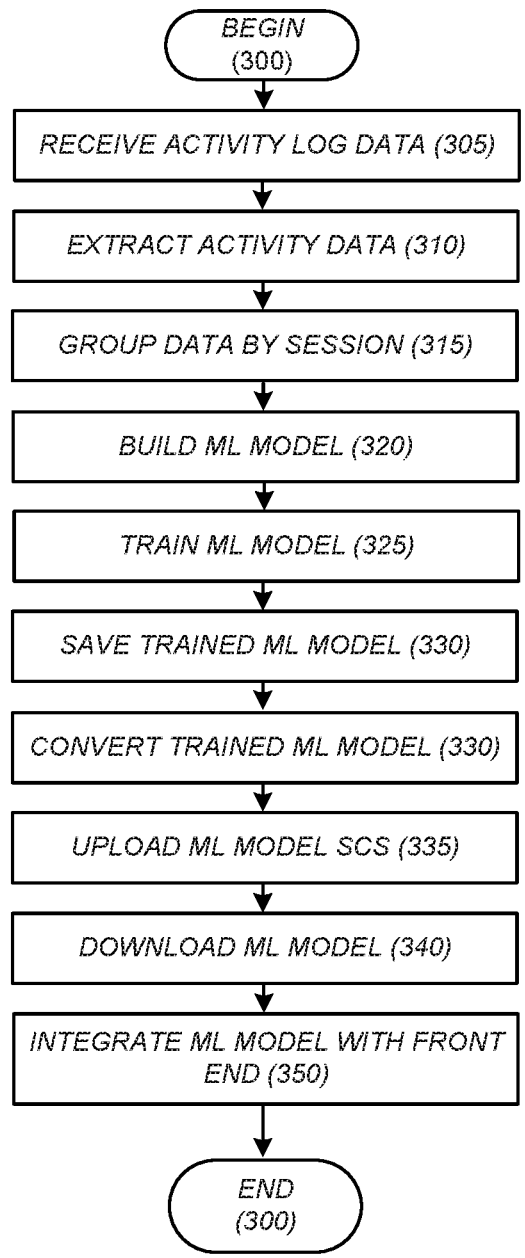
FIG. 5 shows a nonlimiting example of an ML model production process that can be carried out by the CASD system, shown in FIGS. 1 and 3.

The CASD system 10 can include a computer-readable medium that can hold executable or interpretable computer program code or instructions that, when executed by the processor 110, or one or more of the device components in the CASD system 10, can cause the steps, processes and methods in this disclosure to be carried out, including the process 300 (shown in FIG. 5). The computer-readable medium can be provided in the storage 120 or DD 130.

The storage 120 can include a read only memory (ROM) 120A and a random-access memory (RAM) 120B. A basic input/output system (BIOS) can be stored in the non-volatile memory 120A, which can include, for example, a ROM, an EPROM, or an EEPROM. The BIOS can contain the basic routines that help to transfer information between components in the CASD system 10, such as during start-up. The RAM 120B can include a high-speed RAM such as static RAM for caching data.

The DD 130 can include a hard disk drive (HDD) 130A and/or an optical disk drive (ODD) 130B. The HDD 130A can include, for example, an enhanced integrated drive electronics (EIDE) drive, a serial advanced technology attachments (SATA) drive, or any other hard drive device. The ODD 130B can include, for example, a read/write from/to a CD-ROM disk (not shown), or, read from or write to other high capacity optical media such as a digital versatile disc (DVD). The HDD 130A can be configured for external use in a suitable chassis (not shown). The DD 130 can be connected to the system bus 105 by a hard disk drive interface (not shown) and an optical drive interface (not shown), respectively. The hard disk drive interface (not shown) can include a Universal Serial Bus (USB) (not shown), an IEEE 1394 interface (not shown), or any other suitable interface for external applications.

The storage 120 or DD 130, including computer-readable media, can provide nonvolatile storage of data, data structures, and computer-executable code or instructions. The storage 120 or DD 130 can accommodate the storage of any data in a suitable digital format. The storage 120 or DD 130 can include one or more computer applications that can be used to execute aspects of the architecture described herein. The storage 120 or DD 130 can include, for example, flash memory or NVRAM memory.

One or more program modules can be stored in the storage 120 or DD 130, including an operating system (not shown), one or more application programs (not shown), one or more APIs, and program data (not shown). The APIs can include, for example, Web APIs, SOAP APIs, RPC APIs, REST APIs, or other utilities or services APIs. Any (or all) of the program modules can be cached in the RAM 120B as executable sections of computer program code.

The network interface 140 can be connected to a network such as the network 20 or cloud network 30 (shown in FIG. 1). The CASD 10 can connect to one or more communicating devices 40 (shown in FIG. 1) via, for example, the network interface 140 communicating with communicating device 40 over the communication links 5 and network 20. The network interface 140 can be connected to the network 20 or cloud network 30 via one or more communication links 5 (shown in FIG. 1). The network interface 140 can include a wired or a wireless communication network interface (not shown) or a modem (not shown). When used in a local area network (LAN), the CASD system 10 can be connected to the LAN network through the wired or wireless communication network interface; and, when used in a wide area network (WAN), the CASD system 10 can be connected to the WAN network through the modem. The network 20 or cloud network 30 (shown in FIG. 1) can include a LAN, a WAN, the Internet, or any other network. The modem (not shown) can be internal or external and wired or wireless. The modem can be connected to the bus 105 via, for example, a serial port interface (not shown).

The (I/O) interface 150 can receive commands and data from a user, such as, for example, a system administrator. The I/O interface 150 can be arranged to connect to or communication with one or more input/output devices (not shown), including, for example, a keyboard (not shown), a mouse (not shown), a pointer (not shown), a microphone (not shown), a speaker (not shown), or a display (not shown). The received commands and data can be forwarded from the I/O interface 150 as instruction and data signals via the bus 105 to any component in the CASD system 10.

The driver unit 160 can include an audio driver 160A and a video driver 160B. The audio driver 160A can include a sound card, a sound driver (not shown), an IVR unit, or any other device necessary to render a sound signal on a sound production device (not shown), such as for example, a speaker (not shown). The video driver 160B can include a video card (not shown), a graphics driver (not shown), a video adaptor (not shown), or any other device necessary to render an image signal on a display device (not shown).

The MLM builder 180 can include a computing device or module, or it can be included in a computing device or module. The MLM builder 180 can include an ML platform. The ML platform can include supervised machine learning, unsupervised machine learning or both supervised and unsupervised machine learning. The machine learning platform can include, for example, ANN, CNN, DCNN, RCNN, Mask-RCNN, DCED, RNN, NTM, DNC, SVM, DLNN, TD Naive Bayes, decision trees, linear regression, Q-learning, deep adversarial networks, fuzzy logic, or any other machine intelligence platform capable of supervised or unsupervised machine learning. The MLM builder 180 can include one or more platform-neutral or platform-agnostic APIs. The MLM builder 180 can include a natural language processing (NLP) application.

The MLM builder 180 can be arranged to select, create or build one or more ML models that can be used to predict activities on the communicating devices 40 (shown in FIG. 1), when installed to the devices. The MLM builder 180 can be arranged to build ML models autonomously, without any user intervention, by, for example, building the models using model transformation. The ML model can be created to include a Transformer model. The ML model can be built to listen for, monitor and analyze activities on the communicating device 40 (shown in FIG. 1) during a session, and predict the next likely activity on the communicating device 40. The ML model can be built to learn from training data (for example, labeled training data) and learn operator behavior, which can include, for example, operator behavior that generally occurs by end-users of a particular client application or type of client application, or by a particular type of communicating device 40 or group of communicating devices 40. The training data can include, for example, historical activity data training sets that can be retrieved from a website (not shown) such as, for example, GOOGLE® Research>Tools & Downloads>Datasets, found at <<https://research.google/tools/datasets/>>. The training data can include activity log data received from the communicating devices 40 (shown in FIG. 1).

The ML model can be arranged to receive as input a sequence of activities (for example, one or more activities), analyze the sequence of activities, predict the next likely activity and preemptively search or cause a client application to preemptively search for computer assets that are best matches for predicted activity. The ML model can be further arranged to prefetch and preload the best matching computer asset and make it available for rendering on a communicating device 40 (shown in FIG. 1) during a given operator. The MLM builder 180 can arrange the ML model to interact with a client-side client application (such as, for example, a web browser) and, based on the predicted activity, cause the client application to prefetch or preload the best matching computer asset, such that, for example, when the operator performs the predicted activity on the communicating device 40, the computer asset is available and can be rendered nearly instantaneously, thereby eliminating latency.

The database 170 can include a Big Data database. The database 170 can include, for example, a data lake, Hadoop, HBase, NoSQL, PostGres MySQL, or any database or system that can store large amounts of data, and search or retrieve requested data in high-performance computing applications such as, for example, Big Data analysis. The database 170 can store large amounts of activity log data, for example, exabytes, zettabytes, yottabytes, or larger amounts of activity log data. The database 170 can storage large amounts of training set data. The activity log data or training set data can be generated by, for example, a search engine operator, an ISPs or any other source, as understood by those skilled in the machine learning and training technologies. The activity log data can be grouped by sessions. Each session can include a sequence of activities, ordered chronologically. Each activity can be represented by a String.

The activity log data can include, for example: the client application (for example, GOOGLE® search engine) that was used when carrying out the activities; the number of sessions carried on each client application; the length of each session; the activities included during each session; the search results, including computer assets that were identified, viewed, accessed, retrieved, or downloaded during each session; or any other information that can be analyzed to identify activity-based behavior patterns, for example, when using a particular client application, so as to be able to accurately predict an operator's next activity when provided with a sequence of activities that may have occurred during a session on the client app.

The database 170 can include an activity log data database (or partition) 172 and a ML model or (CNN) database (or partition) 174. The activity log data database 172 can store activity log data and activity log training data sets. The activity log training data sets can include labeled training datasets. The ML model database 174 can store ML models built by the MLM builder 180. The ML model database 174 can store train ML models that have been trained by the MLP pipeline 190 and that are ready for deployment to the communicating devices 40 (shown in FIG. 1) via the cloud network 30 (shown in FIG. 1). The ML models can be saved as TensorFlow SavedModels, including complete TensorFlow programs with weights and computations.

The MLM builder 180 can interact with and query the database 170 when building the ML model. A unique ML model can be built for each type of client app (for example, GOOGLE® search engine) that might be included in the communicating device 40 (shown in FIG. 1). A unique ML model can be built for each unique type of communicating device 40 (for example, a model can be built for a GOOGLE® phone). The MLM builder 180 can query the database 170 and analyze activity log data across large pools of activity log data for the particular client app or communicating device 40, so as to be able to build the ML model to consistently and accurately predict activities on a client application or communicating device when presented with a sequence of activities that have occurred during a session of operating the client application or device.

In a nonlimiting embodiment, the MLM builder 180 can be arranged to build the ML model so that it is operator-agnostic and/or platform-agnostic, such that it can work with any operator or communicating device 40 (shown in FIG. 1). Hence, the ML model can be arranged to operate without any personal identification information (PII). The MLM builder 180 can be arranged to build the ML model as an aggregate model that can be used by any operator when using a client app or communicating device 40. The MLM builder 180 can build the ML model so that it can integrate with or be incorporated in the front end computer executable code of a client application, such as, for example, a web browser on the communicating device 40 (shown in FIG. 1) and make predictions locally at the device.

In a nonlimiting embodiment, the MLM builder 180 can build the ML model to include a feed-forward DNN that can predict the next client application to be loaded by the communication device 40 based on a sequence of activities during a session, which can include a chronological sequence of apps that are loaded to the device, at least one of which can follow an activity such as an RPC. The ML model can be arranged to require each input data entry to have the same length. In this regard, the model can be arranged so that, if the number of elements in a sequence is smaller than a predefined parameter (MAX_LENGTH), the ML model can create and add one or more place holders (PLACE_HOLDER) to the end of the input data sequence to make the length of the sequence equal to the predefined parameter (MAX_LENGTH) and, resultantly, create an augmented sequence. The augmented sequence can be fed in the ML model to evaluate and predict the likelihood of each app. The ML model can be arranged to include a Logit model, which is also known as a Logistic Regression model.

The MLM builder 180 can build a Transformer model that is arranged to use the attention mechanism to boost the speed with which the model can be trained. The Transformer model can be arranged to include one or more encoders and one or more decoders, including, for example, stacks of encoders and decoders. An encoder can be arranged to include the feed-forward DNN and the attention mechanism, which can include at least one of the padding attention mask and the look-ahead attention mask.

Figure 4:
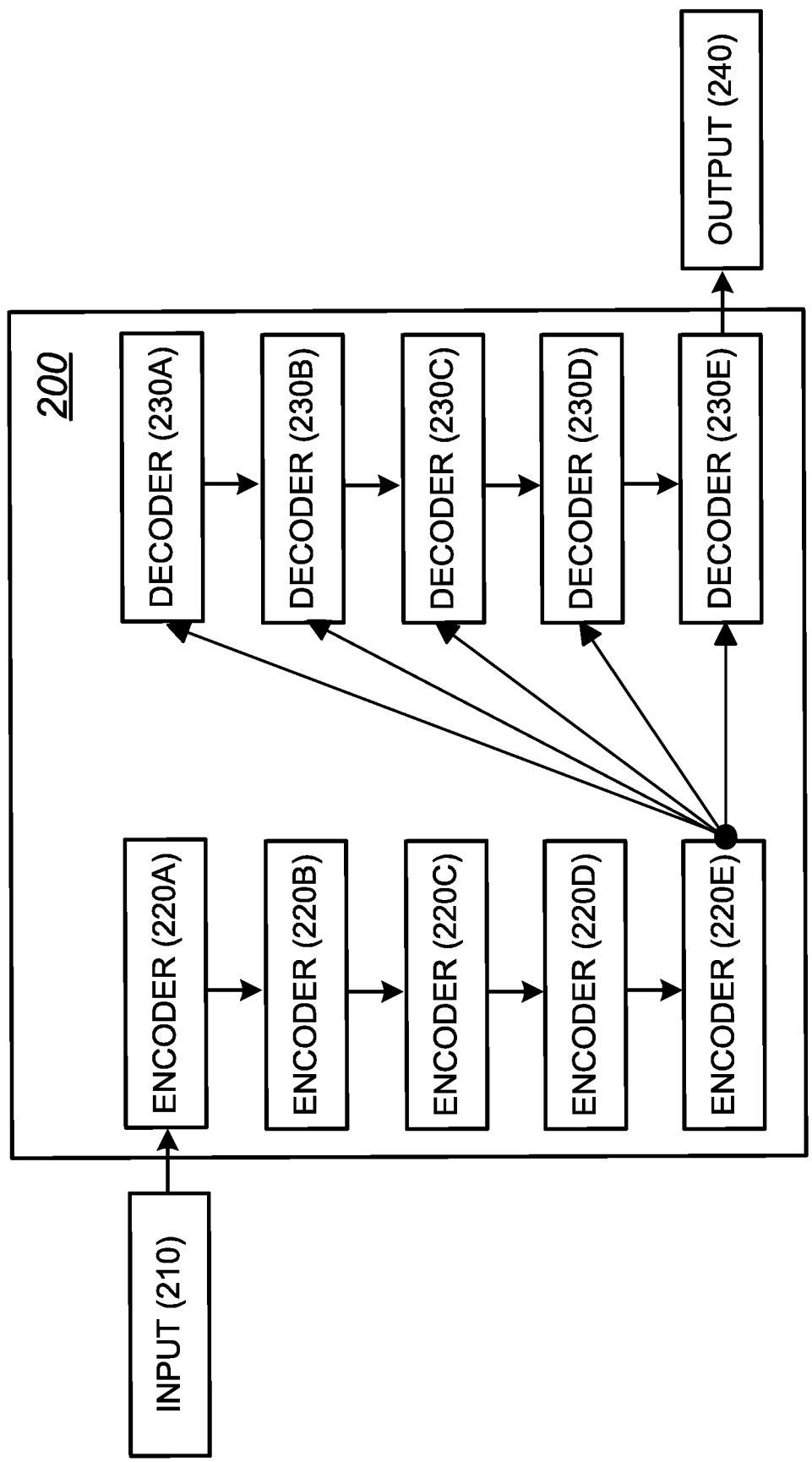
FIG. 4 shows a nonlimiting example of a machine learning (ML) model that can be built or trained by the CASD system in FIGS. 1 and 3.

FIG. 4 shows a nonlimiting example of a Transformer model 200 that is arranged to include an encoder stack 220 and a decoder stack 230. The model 200 can be arranged to receive an input activity sequence 210 at the first encoder 220A in the encoder stack 220 and feed the output from the last encoder 220E to each of the decoders 230A to 230E in the decoder stack 230. The result can be fed simultaneously, in parallel, to all of the decoders in the decoder stack 230. The result from the last decoder 230E in the decoder stack 230 can be output 240 from the model 200. At least one of the encoders 220A to 220E can include a feed-forward DNN and attention mechanism. At least one of the decoders 230A to 230E in the Transformer model 200 can include a feed-forward DNN and an encoder-decoder attention mechanism. The input activity sequence 210 can include a list of Strings, and the model 200 can be arranged to account for the position information of the Strings, including the position of each element in the input activity sequence 210. The Transformer model 200 can include positioning embedding.

The MLP pipeline 190 can be arranged to train the ML model after it has been created or built. The MLP pipeline 190 can include a machine learning pipeline (MLP) platform, such as, for example, a TensorFlow Extended (TFX) pipeline platform. The MLP pipeline 190 can include data ingestion, data validation, feature engineering, model training, model validation, model forwarding and model serving, as understood by those skilled in training and production of machine learning models, as understood by those skilled in machine learning production.

The MLP pipeline 190 can be arranged to train the ML model with fixed data. The MLP pipeline 190 can include a computing device or module. The MLP pipeline 190 can be arranged to generate and serve up-to-date ML models through continuous training with evolving data. The MLP pipeline 190 can be arranged to train the ML model with labeled data. The MLP pipeline 190 can be arranged for optimal feature space coverage and minimal dimensionality.

After the ML model is trained, the MLP pipeline 190 can save the trained ML model, for example, using the TensorFlow SavedModel format, in the ML model database 174 (shown in FIG. 3), which can contain a complete TensorFlow program, including weights and computations. The SavedModel need not have the original model building code to run, thereby making it useful for sharing or deploying. The MLP pipeline 190 can include a converter (not shown), such as, for example, tfjs_converter, which can be found at, for example, <<https://github.com/tensorflow/tfjs/tree/master/tfjs-converter>>. The converter can be arranged to retrieve the ML model from the ML model database 174 (shown in FIG. 3) and convert the ML model (for example, TensorFlow SavedModel), after training is completed, to a format that can be used by a scripting language, such as, for example, JavaScript. The MLP pipeline 190 can be arranged to then upload the converted ML model to the SCS 35 (shown in FIG. 1), which, in turn, can deploy or download the ML model to each of the communicating devices 40 (shown in FIG. 1).

The MLP pipeline 190 can be arranged to convert the trained ML model into a format that can be used by the communicating device 40 (shown in FIG. 1). For instance, the MLP pipeline 190 can convert the trained ML model into a format that can be incorporated in or interact with the front-end code of the web browser app installed on the communicating device 40.

FIG. 5 shows an example of a ML model production process 300 that can be carried out by the CASD system 10 (shown in FIGS. 1 and 3). Initially, activity log data can be received, for example, by the MLM builder 180 (shown in FIG. 3) (Step 305) and preprocessed to extract the activity information, including for example, RPCs and Apps (Step 310). The extracted activity information can be grouped by sessions, in which each session can include a sequence of activities, ordered chronologically (Step 315). Each activity in the sequence can be represented by a String.

Any of several ML model can be built by the MLM builder 180 using the activity information, including for example, the feed-forward DNN or Transformer models (Step 320). If a feed-forward DNN model is built (Step 320), then the ML model can be built to be targeted at predicting the next application to be loaded based on a received activity sequence. This type of ML model may require that each input data entry have the same length. The first element in the input data entry can include, for example, an app that has been loaded, with subsequent elements in the sequence including subsequently occurring activities, such as, for example, RPCs. If the number of elements in a sequence is smaller than a predefined parameter (MAX_LENGTH), the MLM builder 180 can add several "PLACE_HOLDER" to the end to make the length equal to the predefined parameter (MAX_LENGTH). The ML model can be fed with this augmented sequence, so that the model can evaluate the likelihood (logit) of each app occurring. The size of the label set can be the number of distinct apps, such as, for example, between 15 and 30 apps in a nonlimiting example.

If, however, Transformer model is built (Step 320), then the ML model can be built to take in any sequence as input, without the requirement that the first element must be an app. Like the feed-forward DNN model, the Transformer model can require that all input entries have the same length. So, the MLM builder 180 can be arranged to add a "PLACE_HOLDER" to the end of a sequence that is shorter than the MAX_LENGTH. This model can be used to predict any activities, including both RPCs and apps. The label set size can be large, for example, around 2000 in one nonlimiting example.

Regardless of whether a feed-forward DNN model or Transform model is built (Step 320), the ML model can be arranged to model the sequential information. As the inputs can include lists of Strings, the ML model can account for the positioning information of these Strings. For instance, the Transformer model can include positioning embedding. Positioning embedding can also be applied by the feed-forward DNN model.

Once the model is built (Step 320), it can be pipelined for production, for example, by the MLP pipeline 190 (shown in FIG. 3), which can train and save the model, convert the trained model to a format that a client application front-end can use, and, then, upload the model to the static content service (SCS) 35 (shown in FIG. 1). The Strings can be preprocessed and converted to integers, so that they can be treated as numerical features in the ML model.

Once built, the ML model can be trained, for example, by the MLP pipeline 190 (Step 325). The ML model can be trained, for example, using a TFX pipeline that can apply training activity datasets to the model. The trained model can be saved, for example, using a Tensorflow SavedModel, to the database 170 (Step 330). For instance, the trained model (for example, Tensorflow SavedModel) can be saved together with a vocabulary file and a label file in the model database 174 (shown in FIG. 3). Both the vocabulary file and the label file can be saved in son format. The label file can be arranged to be usable by the feed-forward DNN model, but may not be necessary for the Transformer model.

The trained model can then be converted, for example, by the MLP pipeline 190 to a format that is compatible with the communicating device 40 (shown in FIG. 1), or the client apps installed or operating on the device (Step 335). For instance, the MLP pipeline 190 (shown in FIG. 3) can retrieve the model (for example, stored as SavedModel) from the model database 174 and operate the converter (for example, tjfs_converter) on the model to convert it to a format that is, for example, suitable for integration with the front-end code of the web browser on the communicating devices 40 (shown in FIG. 1).

Figure 6:
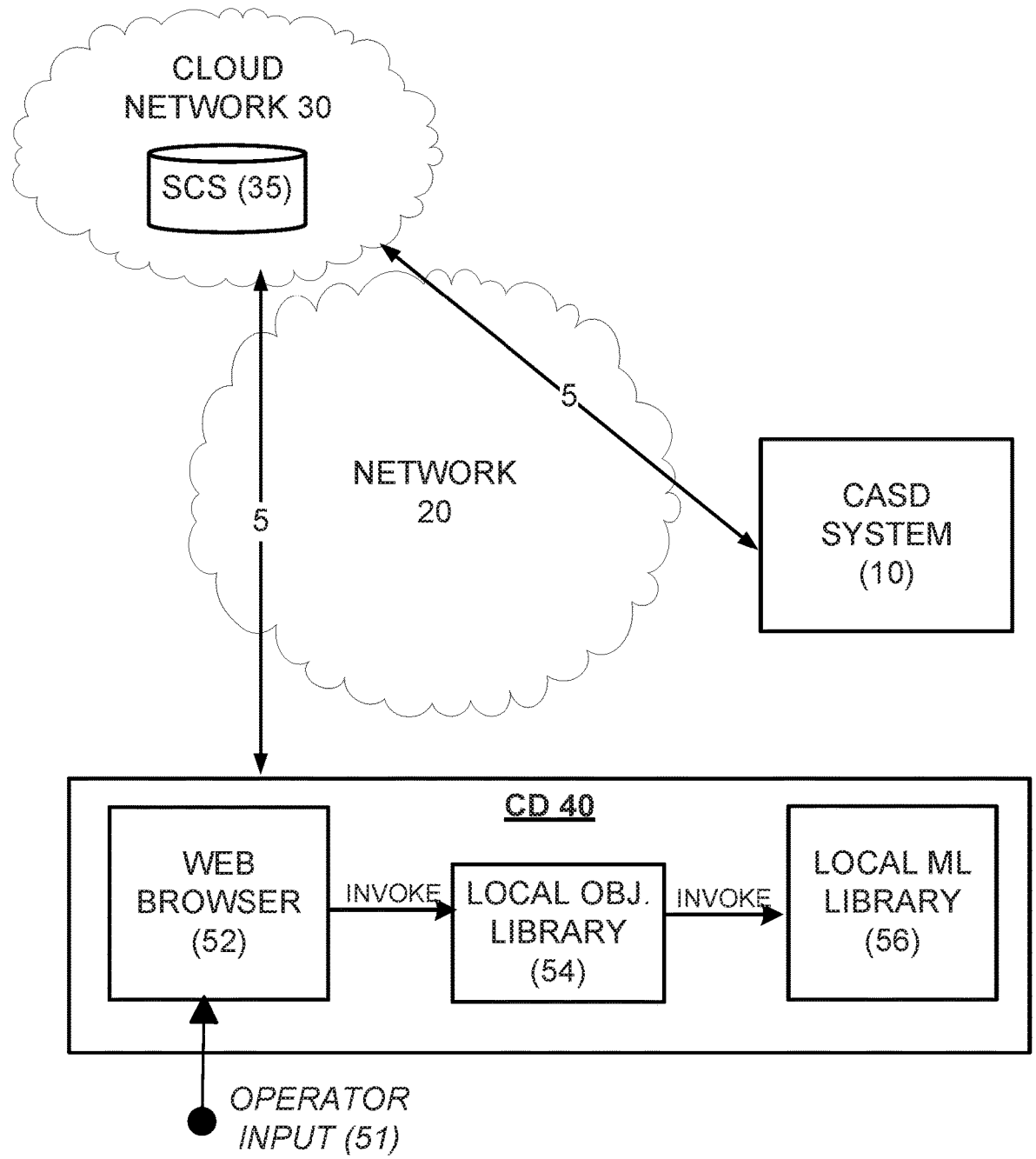
FIG. 6 depicts a block diagram of a nonlimiting example of loading and integration of an ML model to the communicating device shown in FIGS. 1 and 2.

The converted ML model can be uploaded, for example, by the MLP pipeline 190 (shown in FIG. 3) to the SCS 35 (Step 335). The ML model can then be deployed or downloaded by the SCS 35 (shown in FIG. 1) to the communicating devices 40 (Step 340), which, in turn, can load the model and integrate it with the front-end code of the web browser on the device (Step 350). FIG. 6 shows a block diagram of a nonlimiting example of the loading and integration of the model to the communicating device (CD) 40.

Referring to FIG. 6, in Step 350, the communicating device (CD) 40 downloads the model from the SCS 35 via a communication link 5 over the network 20. The model is integrated into the web browser 53 on the CD 40. A local object library 54 and local machine learning (ML) library 56 can be created or updated on the CD 40. In a nonlimiting embodiment, the local object library 54 can include a web or core library, such as, for example, a TFJS Dart library; and, the local ML library 56 can include a library for machine learning, such as, for example, TFJS JavaScript library (e.g., TensorFlow.js library). Once integrated into the web browser 53, the ML model can receive as input an activity sequence 51 and, based on the past activities in the sequence, the model can predict the next activity that is likely to occur during the session. The model can invoke the web browser 52 to preemptively search for a computer asset based on the predicted activity and prefetch or preload the computer activity that is a best match result for the predicted activity. The web browser 52 can prefetch, for example, JavaScript asynchronously from a server on the network 20, in a background thread, while allowing the operating to interact with the user interface on the communicating device 40 (shown in FIG. 1). The preloaded computer asset can be made readily available to the communicating device 40, thereby minimizing or eliminating latency in providing the computer asset on the device in response to a next activity that matches the predicted activity.

The web browser 52 can be arranged to write activity log data to, for example, the activity log database 172 (shown in FIG. 3).

The web browser 52 can be arranged to invoke the local object library 54 to read or apply the ML model, which in turn can invoke, for example, the JavaScript in the local ML library 56.

To provide for interaction with a user, the systems and techniques described here can be implemented on a computing device having a display device such as, for example, a CRT (cathode ray tube), LCD (liquid crystal display) or LED (light emitting diode) monitor for displaying information to the user and a keyboard and a pointing device, such as a mouse or a trackball, by which the user can provide input to the computing device. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The terms "a," "an," and "the," as used in this disclosure, means "one or more," unless expressly specified otherwise.

The term "activity," as used in this disclosure with regard to a communicating device, means an input, entry, instruction, selection, action, or any interaction with the communicating device by a client-side user that can cause the communicating device to perform or carry out a process, task, function, or operation. An "activity" can include, for example, launching a client app such as a web browser in the communicating device or interacting with the client app to find, fetch, load, process, or render a computer asset based on a sequence of input data or instructions (for example, an entry comprising a single or a sequence of natural language terms).

The term "backbone," as used in this disclosure, means a transmission medium or infrastructure that interconnects one or more computing devices or communicating devices to provide a path that conveys data packets or instructions between the computing devices or communicating devices. The backbone can include a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, GSM voice calls, SMS, EMS, MMS messaging, CDMA, TDMA, PDC, WCDMA, CDMA2000, GPRS, WiFi, WiMAX, IEEE 802.11, DECT, 0G, 1G, 2G, 3G, 4G or 5G cellular standards, or Bluetooth. A communication link can include, for example, an RS-232, RS-422, RS-485, or any other suitable interface.

The terms "computer" or "computing device," as used in this disclosure, means any machine, device, circuit, component, or module, or any system of machines, devices, circuits, components, or modules, which can be capable of manipulating data according to one or more instructions, such as, for example, without limitation, a processor, an application specific integrated circuit (ASIC), a field programmable gate array (FPGA), a microprocessor (µP), a central processing unit (CPU), a graphic processing unit (GPU), a general purpose computer, a super computer, a personal computer, a laptop computer, a palmtop computer, a notebook computer, a smart phone, a mobile phone, a tablet, a desktop computer, a workstation computer, a server, a server farm, a computer cloud, or an array of processors, ASICS, FPGAs, µPs, CPUs, GPUs, general purpose computers, super computers, personal computers, laptop computers, palmtop computers, notebook computers, desktop computers, workstation computers, or servers. A computer or computing device can include hardware, firmware, or software that can transmit or receive data packets or instructions over a communication link. The computer or computing device can be portable or stationary.

The term "computer asset," as used in this disclosure, means software, a software application, a web application, a webpage, a document, a file, a record, an API, web content, a computer application, a computer program, computer code, machine executable instructions, or firmware. A computer asset can include an information resource. A computer asset can include machine instructions for a programmable computing device, and can be implemented in a high-level procedural or object-oriented programming language, or in assembly/machine language.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers. The computer-readable medium can include magnetic discs, optical disks, memory, or Programmable Logic Devices (PLDs).

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "information resource," as used in this disclosure means, but is not limited to, computer code or computer executable instructions that cause content to be displayed on a display device, or to invoke a function to display the content such as on a website or webpage that includes primary content or a search results landing page provided by a search engine.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer implemented method for activity prediction, the method comprising:

building, by a MLM builder associated with the computing device, a machine learning model using activity log data received by the MLM builder, wherein the MLM builder extracts activity information and groups the extracted activity information by session;

training, by the computing device, the machine learning model by applying training activity datasets to the machine learning model, wherein the machine learning model is continuously trained to serve an up-to-date machine learning model;

converting, by the computing device, the machine learning model into a web browser compatible format; and uploading, by the computing device, the machine learning model to a server that is arranged to deploy the machine learning model to a plurality of communicating devices, wherein the machine learning model is arranged to:

receive, by a machine learning model, as input a sequence of one or more prior activities on one communicating device of a plurality of communicating devices, the sequence comprising the one or more prior activities during a session in chronological order, the one or more prior activities comprising at least one of page transitions, button clicks, or remote procedure calls (RPCs);

analyze, by the machine learning model, the sequence of one or more prior activities on the one communicating device, wherein the analyzing includes calculating relevance weights for search results, wherein the relevance weights are indicative of a relevance to prediction data, and identifying the results having the greatest relevance to the prediction data;

predict, by the machine learning model, a next activity on the one communicating device based on the analysis of the sequence of one or more prior activities;

search a computer network based on the predicted next activity to find a computer asset, wherein the computer asset comprises a next application; and preload the computer asset to a storage in the one communicating device.

2. The method of claim 1, further comprising rendering the computer asset as a webpage on the one communicating device.

3. The method of claim 1, wherein the machine learning model is integrated with front-end code of a web browser on the one communicating device.

4. The method of claim 1, wherein the machine learning model is arranged to invoke JavaScript in a web browser on the one communicating device.

5. The method of claim 2, wherein rendering the computer asset as the webpage occurs in response to a further activity on the communicating device.

6. The method of claim 5, wherein the further activity matches the predicted next activity.

7. The method of claim 1, wherein the machine learning model comprises a Transformer model.

8. The method of claim 1, wherein the machine learning model comprises a feed-forward deep neural network model.

9. The method of claim 1, wherein the machine learning model comprises an attention mechanism.

10. The method of claim 9, wherein the attention mechanism comprises a padding attention mask.

11. The method of claim 9, wherein the attention mechanism comprises a look-ahead attention mask.

12. The method of claim 1, wherein the predicted next activity comprises an input on a user interface that includes one or more natural language terms.

13. The method of claim 1, wherein the predicted next activity comprises a search query input to a web browser on said one communicating device.

14. The method of claim 1, comprising, prior to receiving the input:
building the machine learning model;
training the machine learning model;
converting the machine learning model into a web browser compatible format; and
uploading the machine learning model to a server that is arranged to deploy the machine learning model to the plurality of communicating devices.

15. A computing system, comprising:
one or more processors; and
one or more non-transitory computer-readable media storing instructions that are executable to cause the one or more processors to perform operations, the operations comprising:
building, by a MLM builder associated with the computing device, a machine learning model using activity log data received by the MLM builder, wherein the MLM builder extracts activity information and groups the extracted activity information by session;
training a machine learning model by applying training activity datasets to the machine learning model, wherein the machine learning model is continuously trained to serve an up-to-date machine learning model;
converting the machine learning model to a web browser compatible format; and
uploading the converted machine learning model to a server arranged to deploy the machine learning model to a plurality of communicating devices,
wherein the machine learning model is arranged to:
receive as input a sequence of one or more prior activities on one communicating device in the plurality of communicating devices, the sequence comprising the one or more prior activities during a session in chronological order, the one or more prior activities comprising at least one of page transitions, button clicks, or remote procedure calls (RPCs);
analyze the sequence of one or more prior activities on the one communicating device, wherein the analyzing includes calculating relevance weights for search results, wherein the relevance weights are indicative of a relevance to prediction data, and identifying the results having the greatest relevance to the prediction data;
predict a next activity on the one communicating device based on the analysis of the sequence of one or more prior activities;
search a computer network based on the predicted next activity to find a computer asset, wherein the computer asset comprises a next application; and
preload the computer asset to a storage in the one communicating device.

16. The system of claim 15, wherein the machine learning production pipeline includes a TensorFlow Extended (TFX) pipeline and the machine learning model is further arranged to render the computer asset as a webpage on the one communicating device.

17. A non-transitory computer-readable storage medium containing computer executable instructions that, when executed by a computing device, cause the computing device to perform operations, the operations comprising:
building, by a MLM builder associated with the computing device, a machine learning model using activity log data received by the MLM builder, wherein the MLM builder extracts activity information and groups the extracted activity information by session;
training, by the computing device, the machine learning model by applying training activity datasets to the machine learning model, wherein the machine learning model is continuously trained to serve an up-to-date machine learning model;
converting, by the computing device, the machine learning model into a web browser compatible format; and
uploading, by the computing device, the machine learning model to a server that is arranged to deploy the machine learning model to a plurality of communicating devices,
wherein the machine learning model is arranged to:
receive as input a sequence of one or more prior activities on one communicating device in the plurality of communicating devices, the sequence comprising the one or more prior activities during a session in chronological order, the one or more prior activities comprising at least one of page transitions, button clicks, or remote procedure calls (RPCs);
analyze the sequence of one or more prior activities on the one communicating device, wherein the analyzing includes calculating relevance weights for search results, wherein the relevance weights are indicative of a relevance to prediction data, and identifying the results having the greatest relevance to the prediction data;

predict a next activity on the one communicating device based on the analysis of the sequence of one or more prior activities;

search a computer network based on the predicted next activity to find a computer asset, wherein the computer asset comprises a next application; and preload the computer asset to a storage in the one communicating device.

18. The non-transitory computer-readable storage medium of claim 17, wherein the machine learning model is further arranged to render the computer asset as a webpage on said one communicating device.

19. The non-transitory computer-readable storage medium of claim 17, wherein the machine learning model is further arranged to integrate with front-end code of a web browser on said one communicating device.

20. The non-transitory computer-readable storage medium of claim 17, wherein the machine learning model is further arranged to invoke JavaScript in a web browser on said one communicating device.

* * * * *